US006666498B1

(12) United States Patent
Whitten (10) Patent No.: US 6,666,498 B1
(45) Date of Patent: Dec. 23, 2003

(54) DEPLOYABLE AIRFOIL FOR TRUCKS AND TRAILERS

(76) Inventor: W. David Whitten, 955 Stonehenge Dr., Tipp City, OH (US) 45371

(*) Notice: Subject to any disclaimer, the term of this patent is extended or adjusted under 35 U.S.C. 154(b) by 0 days.

(21) Appl. No.: 10/262,368

(22) Filed: Oct. 1, 2002

Related U.S. Application Data (60) Provisional application No. 60/327,152, filed on Oct. 4, 2001, and provisional application No. 60/371,581, filed on Apr. 10, 2002.

(51) Int. Cl.[7] .................................................. B60J 1/00
(52) U.S. Cl. .................................. 296/180.4; 296/180.1
(58) Field of Search .......................... 296/180.4, 180.1, 296/181, 37.6, 168, 171; 180/903; 224/404; 249/207, 215

(56) References Cited

U.S. PATENT DOCUMENTS

| | | | | |
|---|---|---|---|---|
| 2,737,411 | A | * 3/1956 | Potter | 296/180.4 |
| 3,977,716 | A | * 8/1976 | Whited | 296/180.4 |
| 4,142,755 | A | * 3/1979 | Keedy | 296/180.4 |
| 4,236,745 | A | * 12/1980 | Davis | 296/180.4 |
| 4,257,641 | A | * 3/1981 | Keedy | 296/180.4 |
| 4,451,074 | A | * 5/1984 | Scanlon | 296/180.4 |
| 4,458,936 | A | * 7/1984 | Mulholland | 296/180.4 |
| 4,508,380 | A | * 4/1985 | Sankrithi | 296/180.4 |
| 4,601,508 | A | * 7/1986 | Kerian | 296/180.4 |
| 4,682,808 | A | * 7/1987 | Bilanin | 296/180.4 |
| 4,688,841 | A | * 8/1987 | Moore | 296/180.4 |
| 4,702,509 | A | * 10/1987 | Elliott, Sr | 296/180.4 |
| 4,741,569 | A | * 5/1988 | Sutphen | 296/180.4 |
| 4,818,015 | A | * 4/1989 | Scanlon | |
| 4,978,162 | A | * 12/1990 | Labbe | |
| 5,058,945 | A | * 10/1991 | Elliott et al. | |
| 5,190,342 | A | | 3/1993 | Marlowe et al. |
| 5,236,347 | A | * 8/1993 | Andrus | |

(List continued on next page.)

FOREIGN PATENT DOCUMENTS

| | | |
|---|---|---|
| DE | 31 15742 | * 11/1982 |
| GB | 2 098 558 | * 11/1982 |
| GB | 2509681 | 1/1983 |
| GB | 2 148 207 | * 5/1985 |

OTHER PUBLICATIONS

Gutierrez et al., "Aerodynamics Overview of the Ground Transportation Systems (GTS) Project for Heavy Vehicle Drag Reduction;" SAE Technical Paper Series, 1996; pp. 219–236; No. 960906.

Cooper, "The Wind Tunnel Testing of Heavy Trucks to Reduce Fuel Consumption;" SAE Technical Paper Series; 1982; pp. 1–13; No. 821285.

Saltzman et al., "A Reassessment of Heavy–Duty Truck Aerodynamic Design Features and Priorities;" NASA/TP–1999–206574; Jun. 1999; pp. 1–32.

*Primary Examiner*—Kiran Patel
(74) *Attorney, Agent, or Firm*—Stevens & Showalter LLP (57) ABSTRACT

An airfoil to reduce wind resistance of trucks and semi-trailers and moveable between a storage configuration and a deployed configuration. First and second side panels are provided adjacent a rear surface of a truck and are pivotally mounted adjacent the sides of the truck. Upper and lower first end panels are associated with the first side panel, and upper and lower second end panels are associated with the second side panel wherein the end panels are pivotally mounted adjacent upper and lower edges of the truck. In the storage configuration, the end panels are pivoted inwardly and the side panels are pivoted over the end panels. In movement toward the storage configuration, the end panels are actuated for movement outwardly whereby outer edges of the end panels engage and slide along the side panels to cause the side panels to pivot outwardly to the deployed configuration. The side panels are provided with a fold area intermediate proximal and distal lateral edges of the side panels. The fold areas permit the side panels to fold or collapse along a vertical line in order to facilitate compact storage of the side panels in the storage configuration.

21 Claims, 6 Drawing Sheets

U.S. PATENT DOCUMENTS

| | | | | |
|---|---|---|---|---|
| 5,332,280 | A | * | 7/1994 | DuPont, deceased Jacques et al. .................... 296/180.4 |
| 5,348,366 | A | * | 9/1994 | Baker et al. ............. 296/180.4 |
| 5,375,903 | A | * | 12/1994 | Lechner ................... 296/180.1 |
| 5,498,059 | A | * | 3/1996 | Switlik |
| 5,609,384 | A | | 3/1997 | Loewen |
| 5,823,610 | A | * | 10/1998 | Ryan et al. |
| 5,947,548 | A | * | 9/1999 | Carper et al. ............ 296/180.4 |
| 6,092,861 | A | * | 7/2000 | Whelan ................... 296/180.4 |
| 6,257,654 | B1 | * | 7/2001 | Boivin et al. ............ 296/180.4 |
| 6,286,892 | B1 | * | 9/2001 | Bauer et al. ............. 296/180.4 |
| 6,286,894 | B1 | * | 9/2001 | Kingham ................. 296/180.4 |
| 6,309,010 | B1 | | 10/2001 | Whitten |
| 6,409,252 | B1 | * | 6/2002 | Andrus .................... 296/180.4 |
| 6,457,766 | B1 | * | 10/2002 | Telnack ................... 296/180.4 |
| 6,467,833 | B1 | * | 10/2002 | Travers ................... 296/180.4 |
| 6,485,087 | B1 | * | 11/2002 | Roberge et al. .......... 296/180.4 |
| 2002/0005655 | A1 | * | 1/2002 | Bauer et al. ............. 296/180.1 |
| 2002/0021023 | A1 | * | 2/2002 | Leban .................... 296/180.4 |
| 2002/0030384 | A1 | * | 3/2002 | Basford ................... 296/180.1 |

* cited by examiner

DEPLOYABLE AIRFOIL FOR TRUCKS AND TRAILERS

CROSS REFERENCE TO RELATED APPLICATIONS

This application claims the benefit of U.S. Provisional Application Ser. No. 60/327,152, filed Oct. 4, 2001, and U.S. Provisional Application Ser. No. 60/371,581, filed Apr. 10, 2002, which applications are incorporated herein by reference.

BACKGROUND OF THE INVENTION

1. Field of the Invention

The present invention relates generally to aerodynamic devices for use with vehicles, such as trucks and semi-trailers, and in particular relates to an aerodynamic wind drag reduction device or airfoil for attachment to the rear of a truck or trailer and moveable between a storage configuration and a deployed configuration.

2. Description of the Prior Art

As vehicles such as tractor-trailers and transport trucks move at highway speeds, air flows rapidly along the top and sides of the vehicle or trailer. When this air reaches the end of the trailer, it has too much momentum to make an immediate turn to follow the contour around the rear surface of the trailer, such that the air flow becomes detached creating a low pressure area behind the trailer. This low pressure region acts as a vacuum, pulling on the back of the trailer and resisting forward motion. This resistance is called base drag, which ultimately results in lower fuel economy. Studies have estimated that base drag may account for 10 percent of a tractor-trailer's fuel consumption at speeds over 55 mph.

Base drag on trailers could be eliminated if the end of the trailers were provided with a different shape such as a tear drop or half egg shape, in which case the air would flow smoothly and remain attached to the rear of the trailer, minimizing any low pressure region behind the trailer. However, trailers are designed to carry a maximum amount of freight for a given legal weight, width and height, such that economics tend to restrict trailer designs to "boxy" shapes with poor aerodynamics. In addition, trailers are normally loaded and unloaded through doors at the rear of the trailer, requiring that the rear of the trailer be provided with a conventional flat surface to accommodate the doors.

Federal regulations permit a drag reduction device up to five feet in length to be added to a trailer, without counting against the trailer's length limit. Thus, the base drag reduction devices proposed to-date have typically been designed as "add-on" devices, which attach to the rear of the trailer. Unfortunately, these devices generally have not achieved widespread use. In order for a drag reduction device to be widely adopted by the trucking industry, it must not only be aerodynamically effective, but also must meet several criteria relating to the durability and convenience of use of the device. These criteria include: the ability to survive in a difficult environment, including salt spray, ice, road shocks and wind gusts; the ability to deploy and collapse automatically, in that drivers of large fleets do not pay for fuel and cannot be counted on to manipulate a manual device; resistant to damage as trailers are backed into docks, other trailers, or other stationary objects; must be essentially maintenance-free; and must pose no safety risk to other motorists.

Prior art devices include various mechanisms for providing folding frames to define the contour of the airfoil, or for providing an inflatable airfoil which collapses when the vehicle is not in motion. There is a continuing recognized need for providing a drag reduction device including a convenient mechanism for extending and retracting the device, and which will not unduly alter the structure of the trailer or require extensive modifications, and further which requires a minimum number of components resulting in easier and faster deployment and in reduced cost.

SUMMARY OF THE INVENTION

The present invention provides a device or airfoil for decreasing the base drag behind a truck or trailer in order to improve the fuel economy of the trailer. The device is designed to be moveable between a storage configuration and a deployed configuration, and is further designed for automatic operation without manual manipulation of a mechanism by an operator. In addition, the device is designed, in its storage configuration, to be configured to lie closely adjacent to the rear doors of a trailer. Further, the device is designed to provide a curved aerodynamic shape for minimizing the low pressure area behind the trailer when in its deployed configuration.

In accordance with one aspect of the invention, an airfoil is provided to reduce wind resistance of trucks and semi-trailers having a substantially planar rear surface, the airfoil being deployable from a storage configuration to a deployed configuration and comprising: first and second side panels supported at the rear surface; each of the first and second side panels comprising laterally spaced proximal and distal edges, each of the proximal edges defining a pivot edge for pivotally attaching a respective one of the first and second panels adjacent a side of the planar rear surface; each of the first and second side panels including a fold area extending substantially vertically and located intermediate the proximal and distal edges; and wherein the first and second side panels are moveable from the storage configuration located adjacent the rear surface to a deployed configuration extending outwardly from the rear surface, the side panels each folding at the fold area when the side panels are in the storage configuration.

In a further aspect of the invention, an airfoil is provided to reduce wind resistance of trucks and semi-trailers having a substantially planar rear surface, the airfoil being deployable from a storage configuration to a deployed configuration and comprising: first and second side panels supported at the rear surface; each of the first and second side panels comprising laterally spaced proximal and distal and top and bottom edges, each of the proximal edges defining a vertical pivot edge for pivotally attaching a respective one of the first and second panels adjacent a side of the planar rear surface, such that the side panels are pivotally moveable between the storage configuration and the deployed configuration; top and bottom end panel structures, each of the end panel structures including a proximal edge defining a horizontal pivot edge for pivotally attaching a respective one of the top and bottom panels adjacent a top and bottom of the rear surface, the end panel structures including outer edges moveable from the storage configuration adjacent the rear surface to the deployed configuration extending outwardly from the rear surface; and an actuation system comprising at least one flexible structure extending from a side of the rear surface and having an end connected to one of the panels of the airfoil wherein the flexible structure is moveable between an extended and a retracted position to actuate the airfoil in movement between the storage configuration and the deployed configuration.

In accordance with an additional aspect of the invention, an airfoil is provided to reduce wind resistance of trucks and semi-trailers having a substantially planar rear surface, the airfoil being deployable from a storage configuration to a deployed configuration and comprising: a first set of panels pivotally movable toward and away from each other; a second set of panels pivotally movable toward and away from each other in a direction perpendicular to a direction of movement of the first set of panels; the first set of panels being located folded under the second set of panels when in the storage configuration; and the first set of panels actuated for outward pivotal movement from the storage to the deployed configuration, and located for engagement with the second set of panels whereby actuation of the first set of panels from the storage to the deployed configuration includes the first set of panels engaging and pushing outwardly on the second set of panels to move the second set of panels to the deployed configuration.

Other objects and advantages of the invention will be apparent from the following description, the accompanying drawings and the appended claims.

DETAILED DESCRIPTION OF THE PREFERRED EMBODIMENT

Figure 1:
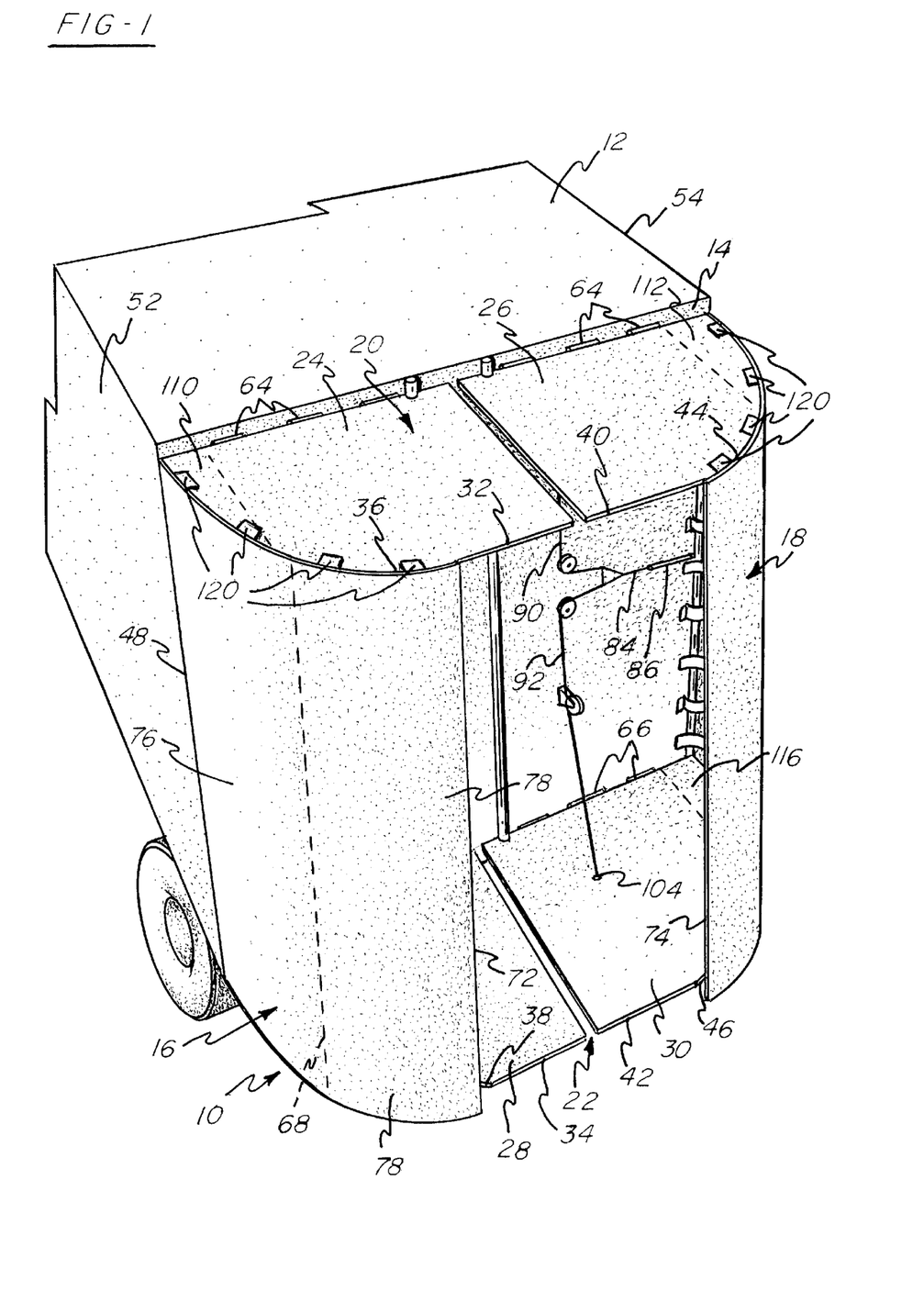
FIG. 1 is a rear prospective view of a truck incorporating the airfoil of the present invention with the airfoil in a deployed configuration.
Figure 2:
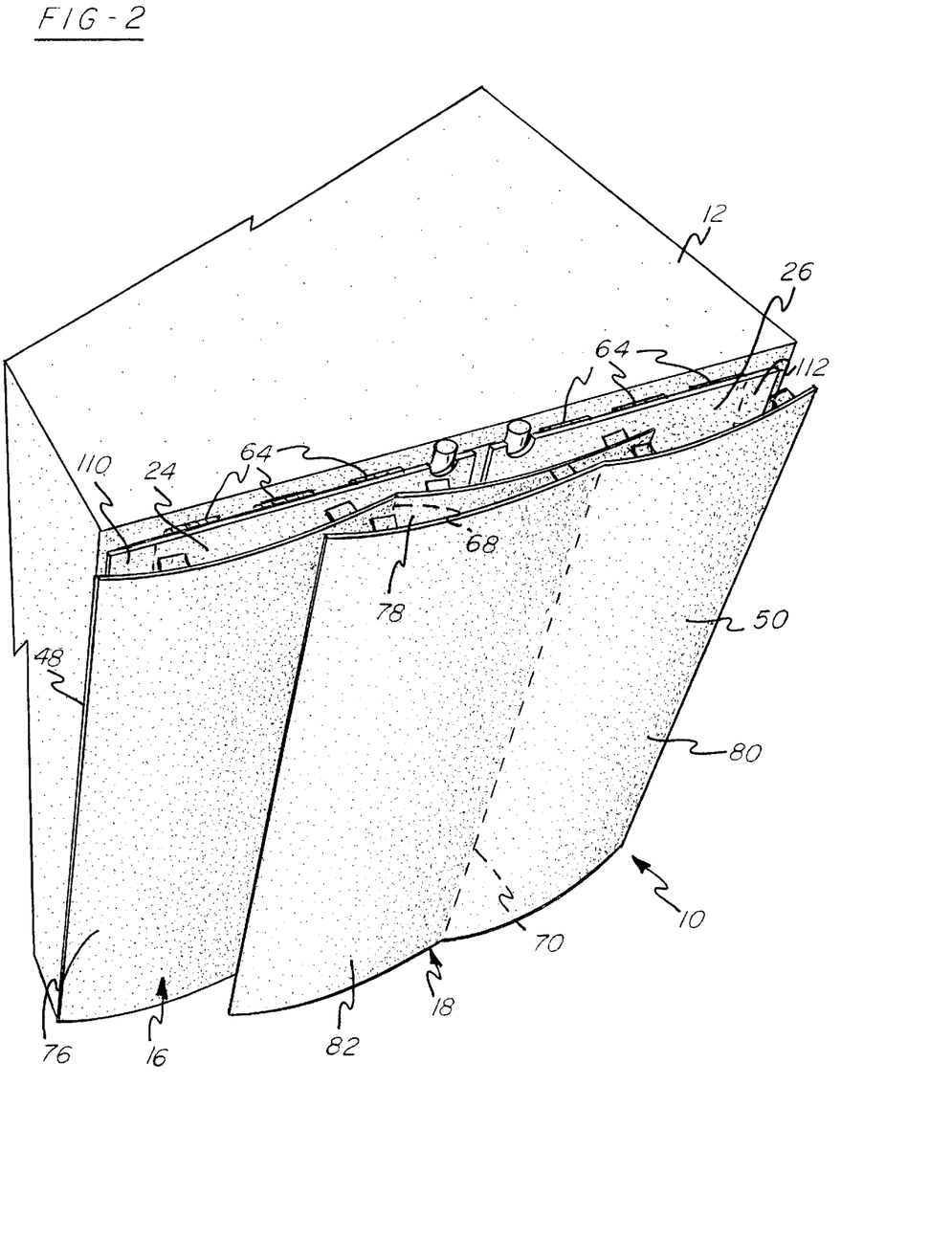
FIG. 2 is a rear prospective view of a truck incorporating the airfoil of the present invention with the airfoil in a storage configuration.

Referring to FIGS. 1 and 2, the present invention provides an airfoil 10 for attachment to the rear of a truck or semi-trailer 12, hereafter collectively referred to as a truck 12, wherein the airfoil 10 is moveable between a deployed configuration (FIG. 1) and a stored or storage configuration (FIG. 2). The airfoil 10 provides a reduced base drag on the rear of the truck 12 wherein the truck 12 includes a substantially planar rear surface 14.

The airfoil 10 includes a left or first side panel 16 and a right or second side panel 18, the first and second side panels 16, 18 being supported at the rear surface 14 of the truck 12. The airfoil further includes upper and lower end panel structures 20, 22, the upper end panel structure 20 including first and second end panels 24, 26, and the lower end panel structure 22 including first and second end panels 28, 30.

The first and second side panels 16, 18 are formed as thin members and are preferably made of a rigid, lightweight material, such as sheet metal, fiberglass, plastic or an equivalent material. The upper and lower end panel structures 20, 22 are also preferably made of a material similar to that of the first and second side panels 16, 18. In addition, each of the side panels 16, 18 are formed to have a shape defining a single direction of curvature of a predetermined radius when in the deployed configuration, and in the preferred embodiment, the side panels 16, 18 each have an external radius of approximately 120 inches in order to support attached air flow for air moving from the front of the truck 12 toward the rear of the airfoil 10. Further, the upper and lower end panel structures 20, 22 angle downwardly and upwardly, respectively, at an angle of approximately 6 degrees in order to minimize the effective area of the airfoil 10. The first panels 24, 28 of the upper and lower end panel structures 20, 22 include an outer edge 32, 34 including a curved portion 36, 38 matching the curvature of the first side panel 16. Similarly, the second end panels 26, 30 of the upper and lower end panel structures 20, 22 have outer edges 40, 42 including a curved portion 44, 46 matching the curvature of the second side panel 18.

Figure 5:
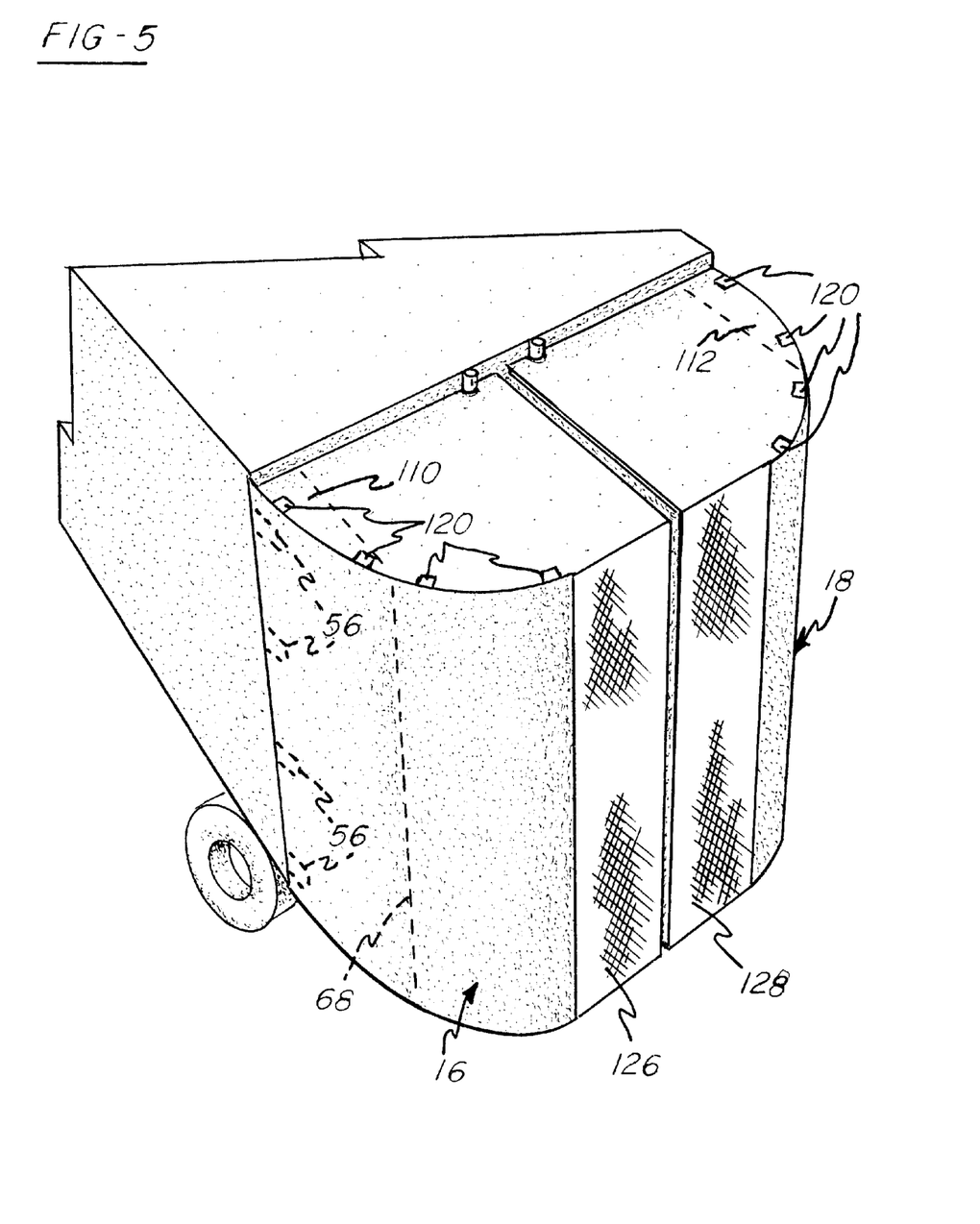
FIG. 5 is a rear prospective view, similar to FIG. 1, in which the airfoil is provided with a fabric rear section.

The first and second side panels 16, 18 include respective proximal edges 48, 50 which are mounted to the rear surface 14 closely adjacent to side surfaces 52, 54 of the truck 12 adjacent vertically extending hinge connections 56, 58 (see also FIG. 5). The hinge connections 56, 58 permit pivotal movement of the first and second side panels 16, 18 toward and away from the rear surface 14, and the hinge connections 56, 58 are preferably mounted to doors 60, 62 defining the rear surface 14 and pivotally mounted at the rear of the truck 12, such that the side panels 16, 18 are pivotally mounted with the doors 60, 62 which are supported on hinges 61, 63. Further, the hinge connections 56, 58 are located spaced inwardly slightly from the proximal edges 48, 50 in order to place the proximal edges 48, 50 flush with the sides 52, 54 of the truck when in the deployed configuration.

In addition, the end panels 24, 26, 28, 30 forming the upper and lower end panel structures 20, 22 are also pivotally mounted to the doors 60, 62 such that the upper and lower end panel structures 20, 22 are pivotally moveable toward and away from the rear surface 14 of the truck in movement between the deployed and storage configurations. The upper and lower end panel structures 20, 22 are mounted for pivotal movement by respective horizontally extending hinge connections 64, 66. In the preferred embodiment, the hinge connections 64, 66 for the upper and lower end panel structures 20, 22, include a spring biasing means for biasing the upper and lower end panel structures 20, 22 toward the deployed configuration extending away from the rear surface 14. Additionally, the hinge connections 56, 58 for the first and second side panels 16, 18 preferably include spring biasing means for biasing the first and second side panels 16, 18 inwardly toward the storage configuration adjacent the rear surface 14 wherein the spring biasing means for the side panels 16, 18 are weaker than the spring biasing means for the upper and lower end panel structures 20, 22. Thus, the upper and lower end panel structures 20, 22 are capable of pivoting outwardly under the biasing force at the hinge connections 64, 66 and moving the side panels 16, 18 outwardly toward the deployed configuration against the spring biasing force at the vertical hinge connections 56, 58. It should be understood that the spring biasing means incorporated with the hinge connections 56, 58, 64, 66 may be any conventional known spring to perform the desired biasing operation, including spring-loaded hinges, ordinary coil springs and gas struts, as well as other conventional equivalent spring mechanisms.

Each of the side panels 16, 18 is formed with a fold area 68, 70 located between a proximal edge 48, 50 and respective a distal edge 72, 74. The fold areas 68, 70 extend vertically and permit inward bending of the first and second side panels 16, 18 in the storage configuration whereby the outward extension of the side panels 16, 18 from the rear surface 14 in the storage configuration is approximately one quarter the amount of extension that would occur if the hinge areas 68, 70 were not provided. In the storage configuration, each of the side panels 16, 18 define two distinctly curved portions extending from the proximal edge 48, 50 to the fold area 68, 70, and extending from the fold area 68, 70 to the distal edge 72, 74 to thereby provide a near flat configuration for the side panels 16, 18 when in the storage configuration.

It should be understood that the fold areas 68, 70 may be defined by a separate hinge structure, such as for connecting front and rear portions 76, 78 of the first side panel 16 and front and rear portions 80, 82 of the second side panel 18. Alternatively, the fold areas 68, 70 may be formed as living hinges, such as an integral hinge area formed in a known manner by creating a flexible hinge area in the material of the first and second side panels 16, 18. Also within the scope of the present invention is formation of the fold areas 68, 70 as a bendable area permitting a smooth bending or wave shape extending inwardly in the region of the fold areas 68, 70. It should be understood that the fold areas 68, 70 permit bending of the side panels 16, 18 in one direction to provide a collapsed configuration, while limiting the return bending or hinging of the panels 16, 18 outwardly to the deployed configuration, such that the side panels 16, 18 will consistently return to the same desired radius of curvature when in the deployed configuration.

Figure 4:
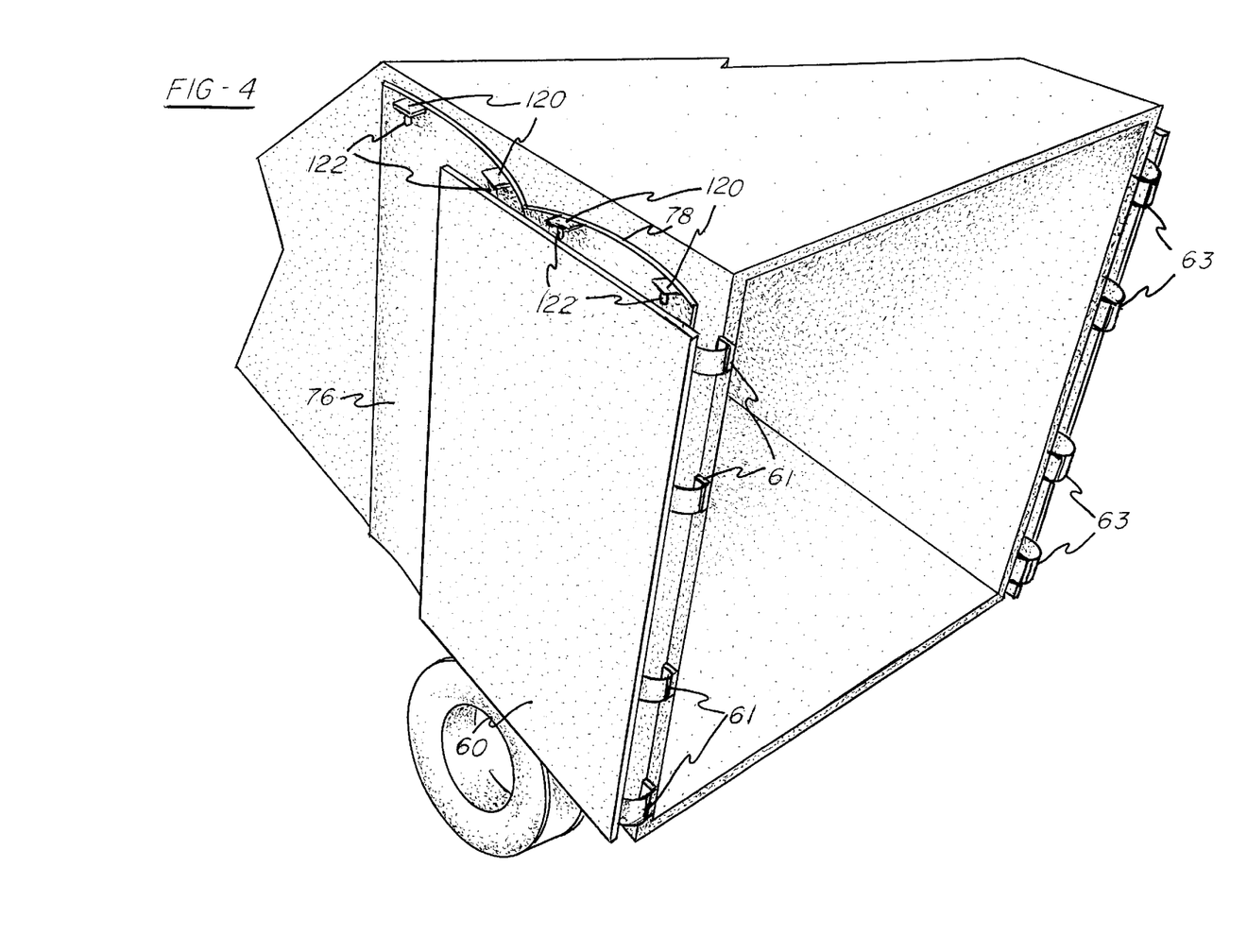
FIG. 4 is a rear prospective view showing one half of the airfoil pivoted with a truck door to one side of the truck.

Referring to FIG. 4, the first side panel and associated door 60 is illustrated swung open along the side 52 of the truck. In this view, it can be seen that collapsing of the panel at the fold area 68 permits the door 60 to be folded closely adjacent to the side 52, allowing efficient use of the space adjacent the truck facilitating close location of adjacent trucks to the sides 52, 54.

Figure 3:
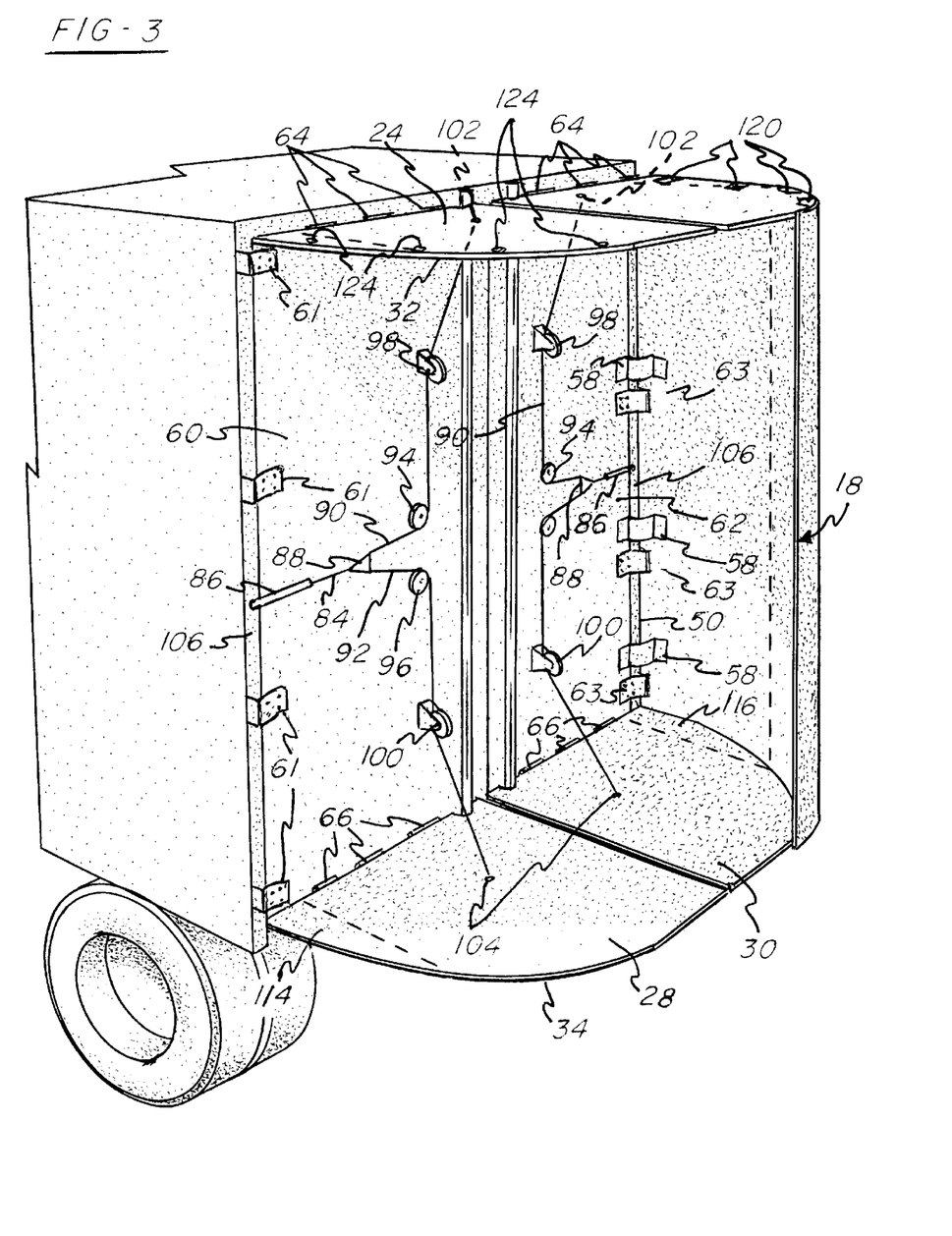
FIG. 3 is a rear prospective view, similar to FIG. 1, in which a side panel is removed in order to illustrate the actuation mechanism for both sides of the airfoil.

Referring to FIGS. 1 and 3, an actuation mechanism is provided for actuating the airfoil 10 from the storage configuration to the deployed configuration, and will initially be described with reference to the mechanism for actuating the first side panel 16 and first upper and lower end panels 24, 28. The actuation mechanism includes a main cable 84 routed through a flexible conduit 86, the flexible conduit 86 having an end attached to the trailer door 60. The main cable 84 ends in a branch connector 88 to transmit translational movement to branch cables 90, 92. The branch cables 90, 92 extend around respective pulleys 94, 96 which rotate about axes extending perpendicular to the door 60. The branch cables 90, 92 extend upwardly and downwardly, respectively, to pulleys 98, 100 which are supported on the door 60 to rotate about an axis parallel to the plane of the door 60 and which direct the cable 90, 92 to attachment points 102, 104 on the upper and lower panels 24, 28.

Figure 6:
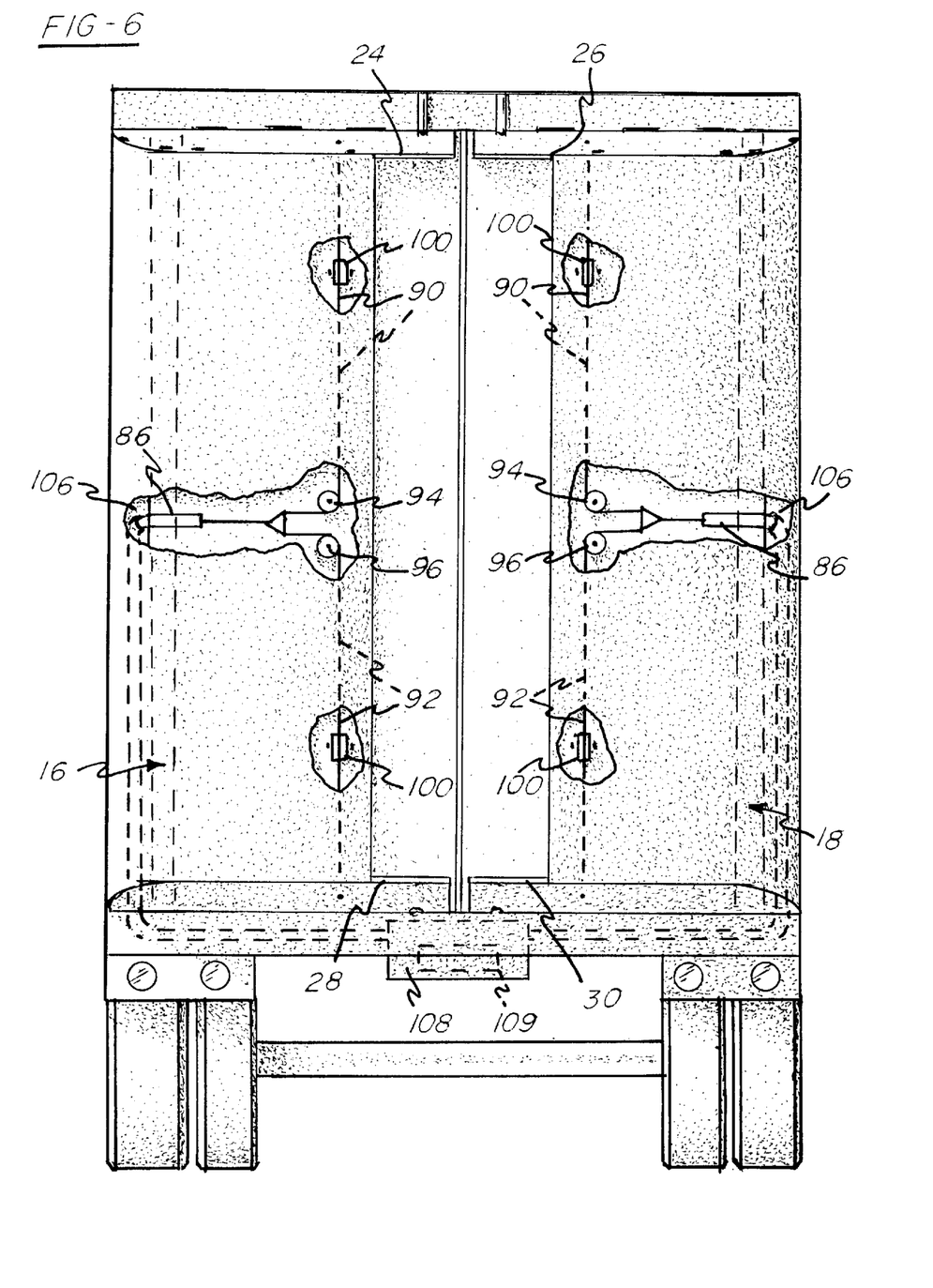
FIG. 6 is a rear view of the truck with the airfoil in the deployed configuration and illustrating the actuator for the airfoil.

Referring to FIGS. 3 and 6, the flexible conduit 86 extends through a frame member 106 at the side edge of the truck 12 and downwardly to an actuator 108. The actuator 108 moves the main cable 84 relative to the flexible conduit 86. As the cable 84 is drawn toward the actuator 108, the branch cables 90, 92 simultaneously pull the upper and lower end panels 24, 28 toward the rear surface 14, to move the airfoil to the storage configuration with the end panels 24, 28 folded against the door 60 and the first side panel collapsed over the end panels 24, 28. The actuator 108 may be a pneumatic actuator, such as one incorporating a spring brake chamber 109. For example, a conventional spring brake chamber 109 for use in the present invention may be a part number TR-LP3TS spring brake chamber sold by the MGM Brake Division of Indian Head Industries of Charlotte, N.C. Such a spring brake chamber 109 has an actuator shaft with a stroke of approximately 3 inches, and the actuator 108 may include a motion multiplier such as a conventional lever or pulley system to increase the output travel to 12 inches.

In operation, pneumatic pressure provided to the actuator 108 causes the actuator shaft (not shown) of the spring brake chamber 109 to actuate and feed the cable 84 out of the flexible conduit 86. Similarly, release of pneumatic pressure, such as by means of a servo valve (not shown), permits a spring (not shown) within the spring brake chamber 109 to move the actuator shaft and cause the cable 84 to be drawn into the flexible conduit 86.

In particular, actuation of the airfoil 10 to the deployed configuration is accomplished by the actuator 108 being actuated and moving the cable 84 such that the end panels 24, 28 are released to pivot outwardly under the spring force at the hinge connection 64, 66. During outward pivotal movement of the end panels 24, 28, the outer edges 32, 34 thereof engage and slide along the inner surface of the first side panel 16 causing the first side panel 16 to pivot outwardly against the spring force at the hinge connection 56 and thereby move to its outward-most deployed configuration. As noted previously, the spring force at the hinge connections 64, 66 is greater than the spring force applied to the hinge connections 56, 58, such that the end panel structures 20, 22 are capable of pivoting the side panels 16, 18 outwardly by means of the force applied to the spring biasing means at the hinge connections 64, 66.

Further, it should be understood that an identical actuation cable structure is provided for actuating the second upper and lower end panels 26, 30 and second side panel 18. Elements of the actuation cable system for the second end panels 26, 30 corresponding to the cable structure for actuating the first end panels 24, 28 are labeled with the same reference numerals and operate in a similar manner, in response to actuation by the actuator 108.

It should be noted that each cable 84 may be connected to the actuator 108 by means of a coil spring (not shown) to take up slack caused by cable stretch. In addition, such spring may also serve to reduce any actuation jerk on the cable.

It should also be noted that the upper end panels 24, 26 and lower end panels 28, 30 each include an outer flexible area 110, 112, 114, 116 which allow a limited amount of flexing of the respective panels 24, 26, 28, 30 as they are pivoted outwardly and slide along the inner surface of the side panels 16, 18. The flexible areas 110, 112, 114, 116 may be formed as a separate piece of different material from the end panels 24, 26, 28, 30, or may be formed integrally therewith and structurally configured to be more flexible than the remaining portion of the corresponding panel.

It should further be noted that the side panels 16, 18 and end panels 24, 26, 28, 30 may be provided with cooperating portions for locking the end panels 24, 26, 28, 30 in engagement with the side panels 16, 18 to prevent relative movement between the end panels and side panels when in the deployed configuration. Specifically, the side panels 16, 18 may be provided with latch portions 120 extending inwardly from the inner surface of the side panels 16, 18. The latch portions 120 include a tang or peg 122 extending generally parallel to the inner surfaces of the first and second side panels 16, 18. The end panels 24, 26, 28, 30 are each formed with a catch portion comprising a hole 124 for receiving the peg 122 therein. Thus, pivotal movement of the end panels 24, 26, 28, 30 from the storage configuration to the deployed configuration operates to move the holes 124 into engagement with the pegs 122 when the end panels 24, 26, 28, 30 are in their final position relative to the side panels 16, 18, and thereby provide a locking engagement which prevents the side panels 16, 18 from moving outwardly relative to the end panels 24, 26, 28, 30 during operation of the truck, and thus act as a transverse support to the side panels 16, 18 to create a rigid airfoil structure.

It should be understood that other equivalent engagement or cooperating portions may be provided to form a detachable connection between the side panels 16, 18 and the upper and lower end structures 20, 22.

Referring to FIG. 5, the airfoil 10 may additionally be provided with flexible or fabric rear portions 126, 128 extending between the first and second end panels 24, 28 and 26, 30, respectively. The fabric portions 126, 128 may be formed of any suitable material, such as canvas, for preventing airflow into the interior area of the airfoil 10, while providing a flexible member which permits folding of the end panel structures 20, 22. The fabric portions 126, 128 may be provided with stiffening members (not shown) for facilitating stiffening of the fabric portions 126, 128 when in use and for permitting the fabric portions 126, 128 to be folded when in the storage configuration. Such stiffening members are disclosed in U.S. Pat. No. 6,309,010, which patent is incorporated herein by reference.

The actuation of the actuator motor 108 may be controlled off of the truck's ABS system in order to provide for automatic actuation of the airfoil from the storage to the deployed configuration when the truck 12 is moving at a predetermined speed, and for retraction of the airfoil, such as when the truck is parking or moving at a reduced speed.

Further, it should be noted that although a single actuator 108 is shown for actuating both sides of the airfoil, a separate actuator may be provided adjacent each side of the truck for actuating the separate sides of the airfoil. Additionally, it should be understood that pneumatic or hydraulic actuators, such as cylinders, may be used in place of the cables or actuation of the airfoil.

Also, other configurations for the cable actuator may be provided, such as plural main cables for separately actuating the first and second upper and lower panel structures.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An airfoil to reduce wind resistance of trucks and semi-trailers having a substantially planar rear surface, the airfoil being deployable from a storage configuration to a deployed configuration and comprising:

first and second side panels supported at the rear surface;

each of said first and second side panels comprising laterally spaced proximal and distal edges, each said proximal edge defining a pivot edge for pivotally attaching a respective one of said first and second panels adjacent a side of the planar rear surface;

each of said first and second side panels including a front portion and a rear portion, and including a fold area extending substantially vertically and located intermediate said proximal and distal edges and said fold area of each side panel connecting respective front and rear portions of said side panels;

said first and second side panels being movable from the storage configuration located adjacent said rear surface to the deployed configuration extending outwardly from said rear surface, said side panels each folding at said fold area when said side panels are in the storage configuration, each said side panel defines a shape having a single direction of curvature extending across both said first and second portions from said proximal edge to said distal edge when positioned in the deployed configuration; and when in said storage configuration, said front and rear portions of each said side panel located in side-by-side relation to each other adjacent said rear surface, each said front and rear portion further defining a distinct curved shape facing inwardly toward said rear surface, and said fold area defining a direction of curvature opposite from a direction of curvature of each said curved shape.

2. The airfoil of claim 1 including at least one end panel structure located adjacent at least one of an upper and lower edge of said side panels and including a proximal edge defining a pivot point adjacent the rear surface, and further including an outer edge pivotally movable about said pivot point between the storage configuration and the deployed configuration.

3. The airfoil of claim 2 wherein said outer edge of said at least one end panel structure cooperates with at least one of said side panels during movement of said side panels toward the deployed configuration.

4. The airfoil of claim 3 wherein said at least one end panel structure engages said at least one side panel in sliding engagement, and said at least one side panel moves from the storage configuration to the deployed configuration in response to pivotal movement of said at least one end panel structure.

5. The airfoil of claim 4 including an actuation system operating on said at least one end panel structure to move said end panel structure from the storage configuration to the deployed configuration and thereby move said at least one side panel from the storage configuration to the deployed configuration.

6. The airfoil of claim 5 wherein said at least one end panel structure is resiliently biased outwardly from the rear surface and said at least one side panel is resiliently biased toward the rear surface, and said actuation system operates to draw said at least one end panel structure in toward the rear surface to the storage configuration.

7. The airfoil of claim 6 wherein the actuation system comprises a cable system extending along the rear surface and connected to said at least one end panel structure.

8. The airfoil of claim 1 wherein said first and second side panels are mounted to respective pivotally mounted doors forming the rear surface and are pivotally movable with the doors to respective sides of the transport compartment.

9. An airfoil to reduce wind resistance of trucks and semi-trailers having a substantially planar rear surface, the airfoil being deployable from a storage configuration to a deployed configuration and comprising:

first and second side panels forming a first pair of panels supported at the rear surface;

each of said first and second side panels comprising laterally spaced proximal and distal edges and top and bottom edges, each said proximal edge defining a vertical pivot edge for pivotally attaching a respective one of said first and second panels adjacent a side of the planar rear surface, such that said side panels are pivotally movable between the storage configuration and the deployed configuration;

top and bottom end panel structures forming a second pair of panels, each said end panel structure including a proximal edge defining a horizontal pivot edge for pivotally attaching a respective one of said top and bottom panels adjacent a top and bottom of the rear surface, said end panel structures including outer edges movable from the storage configuration adjacent the rear surface to the deployed configuration extending outwardly from the rear surface;

an actuation system comprising at least one flexible structure extending from a side of the rear surface and having an end connected to at least one of said panels of the airfoil wherein said flexible structure is movable between an extended and a retracted position to actuate the airfoil in movement between the deployed configuration and the storage configuration, respectively; and one of said first and second pair of panels comprising an actuating pair of panels and the other of said first and second pair of panels comprising an actuated pair of panels, said actuation system causing said actuating pair of panels to pivot outwardly from the storage configuration to the deployed configuration, said panels of said actuating pair of panels including edges which engage and slide across inner surfaces on said panels of said actuated pair of panels such that said actuating pair of panels push said actuated pair of panels outwardly to the deployed configuration.

10. The airfoil of claim 9 wherein said top and bottom end panel structures comprise said actuating pair of panels and said first and second side panels comprise said actuated pair of panels.

11. The airfoil of claim 10 wherein a flexible structure is connected to each of said end panel structures for actuating said end panel structures in movement between the storage configuration and the deployed configuration.

12. The airfoil of claim 11 wherein said flexible structures each comprise a central cable member extending from a location adjacent the vertical pivot edge for each said side panel, and a pair of branch cable members extending upwardly and downwardly from said central cable members to said upper and lower panel structures, respectively, and including an actuator driver for causing movement of each of said central cable members between the extended and retracted positions.

13. The airfoil of claim 11 wherein said end panel structures are biased to the deployed configuration and said side panels are biased to the storage configuration.

14. The airfoil of claim 9 wherein said top and bottom end panel structures each include a first and a second end panel member, said first end panel members located in sliding engagement with said first side panel, adjacent said top and bottom edges thereof, and said second end panel member located in sliding engagement with said second side panel, adjacent the top and bottom edges thereof.

15. The airfoil of claim 9 wherein each of said first and second side panels include a fold area extending substantially vertically between said top and bottom edges and located intermediate said proximal and distal edges, said side panels each folding at said fold area when said side panels are in the storage configuration.

16. The airfoil of claim 15 including an elongated frame portion defining a frame forming the rear surface wherein said flexible structure extends within said frame portion.

17. An airfoil to reduce wind resistance of trucks and semi-trailers having a substantially planar rear surface, the airfoil being deployable from a storage configuration to a deployed configuration and comprising:

a first set of panels pivotally movable toward and away from each other;

a second set of panels pivotally movable toward and away from each other in a direction perpendicular to a direction of movement of said first set of panels;

said first set of panels being located folded under said second set of panels when in the storage configuration; and said first set of panels actuated for outward pivotal movement from the storage to the deployed configuration, and located for engagement with said second set of panels whereby actuation of said first set of panels from the storage to the deployed configuration includes an edge on each panel of said first set of panels engaging and pushing outwardly on an inner surface of a respective panel of said second set of panels in sliding engagement to move said second set of panels to the deployed configuration.

18. The airfoil of claim 17 wherein said second set of panels are resiliently biased toward the storage configuration.

19. The airfoil of claim 18 wherein said first set of panels are resiliently biased toward the deployed configuration.

20. An airfoil to reduce wind resistance of trucks and semi-trailers having a substantially planar rear surface, the airfoil being deployable from a storage configuration to a deployed configuration and comprising:

first and second side panels supported at the rear surface, and each said first and second side panel including a front portion and a rear portion;

each of said first and second side panels comprising laterally spaced proximal and distal edges and top and bottom edges, each said proximal edge defining a vertical pivot edge for pivotally attaching a respective one of the first and second panels adjacent a side of the planar rear surface;

top and bottom end panel structures, each comprising first and second end panel members, each said end panel member including a proximal edge defining a horizontal pivot edge for pivotally attaching a respective one of the top and bottom panel members adjacent a top and bottom of the rear surface, said end panel members including outer edges movable from the storage configuration located adjacent the rear surface to the deployed configuration located extending outwardly from the rear surface wherein said outer edges slide in engagement with inner surfaces of said side panels to move said side panels from the storage configuration adjacent the rear surface to the deployed configuration extending outwardly from the rear surface and defining curved side surfaces for the airfoil when in the deployed configuration, each side surface having a single direction of curvature extending across respective front and rear portions;

said first and second side panels each including a fold area extending substantially vertically between said top and bottom edges connecting respective front and rear portions and located intermediate said proximal and distal edges of said side panels, said side panels each folding at said fold area when said side panels are in the storage configuration such that, in the storage configuration, said front and rear portions of each said side panel are located in side-by-side relation and define at least two distinct curved shapes, extending from said proximal edge of the respective side panel to said fold area and from said fold area to said distal edge of the respective side panel, each said distinct curve shape facing inwardly toward said rear surface with said fold area of each side panel located closely adjacent to the rear surface;

said first and second side panels and said top and bottom end panel structures being mounted to a pair of doors defining the rear surface, and being movable with a respective one of said doors;

an actuator for simultaneously actuating said first and second side panels and said top and bottom end panel structures in movement between the storage configuration and the deployed configuration.

21. The airfoil of claim 20 wherein a flexible structure is connected to each of said end panel structures for actuating said end panel structures in movement between the storage configuration and the deployed configuration, each said flexible structure comprising a central cable member extending from a location adjacent the vertical pivot edge for each said side panel, and a pair of branch cable members extending upwardly and downwardly from said central cable members to said upper and lower panel structures, respectively, and including an actuator driver for causing movement of each of said central cable members between extended and retracted positions.

* * * * *

UNITED STATES PATENT AND TRADEMARK OFFICE
CERTIFICATE OF CORRECTION

PATENT NO.     : 6,666,498 B1
DATED          : December 23, 2003
INVENTOR(S)    : W. David Whitten It is certified that error appears in the above-identified patent and that said Letters Patent is hereby corrected as shown below:

<u>Title page,</u>
Item [75], Inventor, reads "955 Stonehenge Dr." should read -- 995 Stonehenge Dr. --.

Signed and Sealed this

Thirteenth Day of April, 2004

JON W. DUDAS
*Acting Director of the United States Patent and Trademark Office*